Aug. 5, 1952 — T. A. RICH — 2,606,092

SENSITIVE MOVING CHART GRAPHIC RECORDER

Filed Dec. 20, 1947 — 2 SHEETS—SHEET 1

Inventor:
Theodore A. Rich,
by His Attorney.

Aug. 5, 1952 — T. A. RICH — 2,606,092
SENSITIVE MOVING CHART GRAPHIC RECORDER
Filed Dec. 20, 1947 — 2 SHEETS—SHEET 2

Inventor:
Theodore A. Rich,
by his Attorney.

Patented Aug. 5, 1952

2,606,092

UNITED STATES PATENT OFFICE 2,606,092

SENSITIVE MOVING CHART GRAPHIC RECORDER

Theodore A. Rich, Schenectady, N. Y., assignor to General Electric Company, a corporation of New York Application December 20, 1947, Serial No. 792,879

1 Claim. (Cl. 346—32)

My invention relates to improvements in recorders of the type adapted to make a graphic record of a measured variable upon a moving chart, and particularly to improvements in such recorders adapted to measure and record the magnitude of a variable voltage. The objects of my invention are to provide an improved graphic recorder of high sensitivity in which errors due to the starting torque of signal-responsive members are minimized, and to provide improved apparatus for measuring and recording a variable voltage. The means by which I attain these objects are hereinafter set forth.

Figure 1:
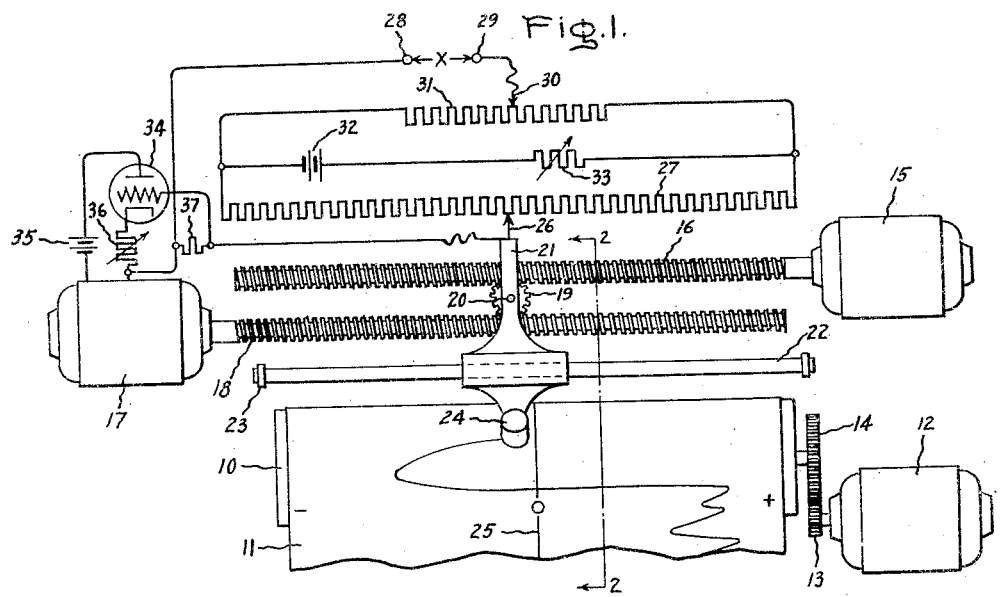
Figure 2:
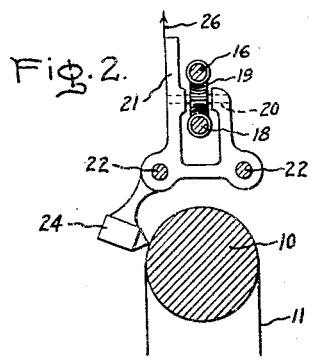
Figure 3:
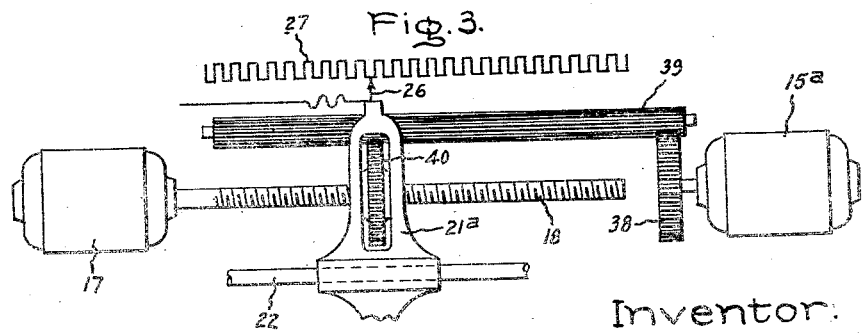
Figure 4:
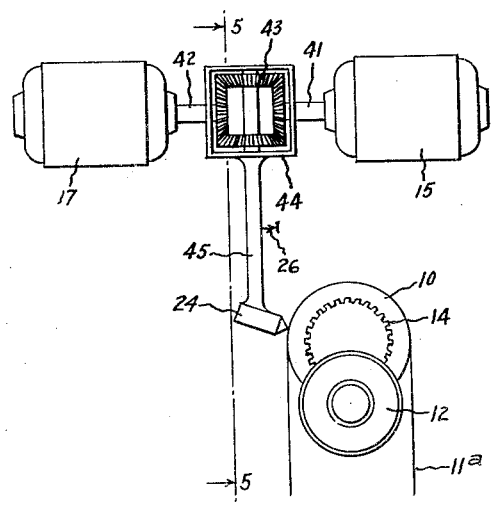
Figure 5:
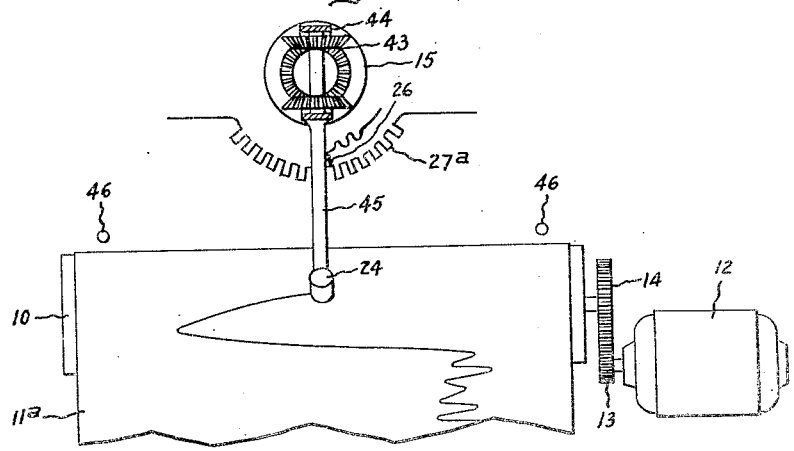

The features of my invention which are believed to be novel and patentable, will be pointed out in the claim appended hereto. For a better understanding of my invention, reference is made in the following description to the accompanying drawings in which Fig. 1 is an elevation of one form of my invention; Fig. 2 is a vertical section along the line 2—2, Fig. 1; Fig. 3 is a fragmentary view of a modification of the apparatus of Fig. 1; Fig. 4 is an elevation of another form of my invention; and Fig. 5 is a section along the line 5—5, Fig. 4. Like reference characters designate like parts throughout the drawings.

Referring now to Figs. 1 and 2 of the drawings, a roller 10 supports a chart 11 upon which the value of a variable measured voltage, or any other value which may be represented by such a voltage, is graphically recorded as hereinafter explained. A motor 12, acting through gears 13 and 14 as shown, rotates roller 10 so that chart 11 is moved past pin 24 at the desired recording speed. A synchronous or other constant speed motor 15 rotates a lead screw 16 at a constant speed. The same motor may be used for 15 and 12 by suitable gearing. A variable speed electric motor 17, governed as hereinafter described, rotates a lead screw 18 in the opposite direction at a speed which varies responsive to any error between the voltage indicated by the recorder and the measured voltage, the differences in speed of the two screws being proportional to such error. The two lead screws are axially parallel one to the other and to the chart, as shown. A gear 19, rotatable about an axle 20, cooperates with both lead screws simultaneously so that when the two screws rotate with equal speeds gear 19 is rotated thereby, but is not translated. If, however, screw 18 rotates faster than screw 16, gear 19 is translated laterally to the left, and if screw 18 rotates slower than screw 16, gear 19 is translated laterally to the right, the rate of such translation being proportional to the difference in speed of the two screws. A carriage 21 is supported by a track 22 and connected to axle 20 as shown, so that the carriage travels laterally across the chart responsive to the translation of gear 19. Stops 23 at each end of the track limit the travel of the carriage to the width of the chart. Motors 15 and 17 are normally designed to deliver little power, so that the speeds of the motors vary responsive to small load changes developed when the travel of carriage 21 is prevented by stops 23, and no damage to the apparatus results. If larger motors are used, stops 23 may be replaced by limit switches. A pen, pencil, or other writing member 24 is attached to the carriage and positioned on the chart. The pen moves to the left across the chart responsive to an increase in the value of the measured voltage, and moves to the right responsive to the decrease in such value.

Carriage 21 is adapted to position an adjustable tap 26 on a resistor 27 responsive to the travel of the carriage. The voltage to be measured X is applied between two terminals 28 and 29. Terminal 29 is connected to an adjustable tap 30 on a resistor 31 which is connected in parallel with resistor 27 as shown. The position of tap 30 determines the zero or reference position of tap 26, as hereinafter explained. A battery or other voltage source 32 connected in series with a variable resistor 33 as shown, provides a constant voltage across resistors 27 and 31, so that a voltage is obtained between tap 26 and tap 30 which is proportional to the difference in position of the two taps, or, stated differently, to the displacement of tap 26 away from a zero or reference position determined by tap 30, and is also proportional to the total voltage across resistors 27 and 31. This latter voltage may be adjusted by varying the value of resistor 33. The difference between the voltage obtained between taps 26 and 30 and the measured voltage X is obtained between tap 26 and terminal 28, since the two voltages are opposed in a series-connected circuit. This difference or error voltage is applied between the grid and cathode of a vacuum tube 34 by connections as shown. The plate and cathode of tube 34 are connected in series with a voltage source 35 and variable speed electric motor 17, as shown, so that the plate current of vacuum tube 34 controls the speed of motor 17. In place of vacuum tube 34 and its associated circuits any means for amplifying direct current may be used. Requirements for increased sensitivity or for larger currents to operate motor 17 will often make more elaborate multi-stage circuits preferable. Such circuits are well known and need not be described here.

In operation the apparatus tends to keep the voltage between tap 26 and terminal 28 constant in value, preferably zero. If this voltage increases, so as to make the grid of vacuum tube 34 relatively more positive, a larger plate current flows through vacuum tube 34 and the speed of motor 17 increases. This rotates screw 18 faster than screw 16, carriage 21 is moved to the left, and the voltage between tap 26 and terminal 28 is reduced. In like manner, if the voltage decreases carriage 21 is moved to the right and the voltage is increased, any unbalance voltage in either direction being quickly and accurately corrected by a movement of the carriage. It is thus evident that the position of carriage 21, or its displacement across chart 11 from its zero or reference position, is a measure of the voltage X applied between terminals 28 and 29. By adjusting resistor 33 and tap 30 both the magnitude of the voltage across resistor 27 and the potential of terminal 29 relative thereto may be varied, to calibrate both the zero position and the sensitivity of the recorder. In Fig. 1, the adjustment shown provides a zero center instrument, since with zero input taps 26 and 30 are substantially in line. Zero position is indicated by reference line 25 on the chart.

A cathode resistor 36 is preferably provided to supply the normal operating bias for vacuum tube 34. The normal error voltage, that is, the voltage between terminal 28 and tap 26 when the carriage is not in motion, may be made zero by adjusting the value of resistor 33, and the impedance between terminals 28 and 29 will then theoretically be infinite, since any voltage applied between terminals 28 and 29 will be exactly balanced by the voltage between taps 26 and 30. Thus no current will flow between the terminals and voltages in a high-impedance external circuit can be measured without "loading" the external circuit. Grid-leak resistor 37 does not lower the impedance between terminals 28 and 29 since the balance voltage across such resistor is zero, and no current flows therethrough.

Having motor 17 and screw 18 rotate continuously and always in the same direction provides several advantages for my apparatus: motor 17 need not be reversible; greatly increased sensitivity is obtained since there is no starting torque to be overcome; increased accuracy is obtained since the motor is initially operating within a speed range in which accurate speed control is possible—for example, the speed of a variable-speed motor can be changed from 900 revolutions per minute to 901 revolutions per minute responsive to a small speed-controlling signal much more easily and accurately in most cases than the speed of the same motor can be changed from 0 to 1 revolution per minute; and improved linearity can be obtained since the range of speed variations may be made relatively small compared to the initial speed.

Those skilled in the art will perceive that various changes in the arrangement and form of parts can be made without altering the operating principles of my invention. One such modification is shown in Fig. 3, which is a fragmentary view showing the modified portion of the apparatus. Constant-speed motor 15a acting through gear 38 and an elongated pinion 39 as shown, rotates gear 40 at a constant speed. Variable speed motor 17 rotates lead screw 18 as hereinbefore explained. Motors 15a and 17 rotate in the same direction, so that pinion 39 and lead screw 18 rotate in opposite directions. Gear 40 is provided with a threaded axial hole and mounted upon lead screw 18, so that the threads of the hole engage the threads of the screw. Thus, when motors 15a and 17 rotate with equal speeds and in the same direction, gear 40 and screw 18 likewise rotate with equal speeds in the same direction, and gear 40 is not translated. But if the speeds of the motors are unequal, gear 40 rotates relative to screw 18 and is thereby translated either to the left or to the right depending upon which motor rotates with the faster speed. Carriage 21a is provided with a slot in which gear 40 is positioned as shown, so that carriage 21a is moved to the left or to the right responsive to like translations of gear 40. Operation of the apparatus is otherwise identical to operation of the apparatus of Fig. 1, hereinbefore described.

Referring now to Figs. 4 and 5, another form of recorder embodying my invention is shown, in which the principles of operation are the same as in the recorder shown in Figs. 1 and 2, although the form and arrangement of certain parts are different. In the following description reference is made to the description hereinbefore given for similar parts in the apparatus of Figs. 1 and 2. A chart 11a is supported by roller 10 which is rotated by motor 12 and gears 13 and 14 as hereinbefore explained. Two shafts 41 and 42 are axially positioned in a straight line as shown. Constant-speed motor 15 rotates shaft 41 at a constant speed and variable-speed motor 17 rotates shaft 42 in the opposite direction at a speed which varies responsive to any error between the voltage indicated by the recorder and the measured voltage, in the manner hereinbefore explained. A set of differential gears 43 contained in a housing 44 interconnect the two shafts as shown. A pen arm 45 is attached to the differential housing and extends outward therefrom substantially perpendicular to the common axis of the two shafts. The pen arm is thereby adapted to rotate about the axis of the shafts, and its outer end travels in an arc laterally across the chart responsive to such rotation. Pins 46, or limit switches, limit such travel to the width of the chart. The action of the differential gears is such that the rotation of the pen arm is proportional to the difference between the rotations of the two shafts. Any error between the indicated voltage and the measured voltage causes a difference in shaft speeds as hereinbefore explained, and a corresponding rotation of the pen arm. A pen 24, or other writing member, is attached to the outer end of pen arm 45 and is moved laterally across the chart by such rotation. Resistor 27a, corresponding in function to resistor 27, Fig. 1, is shaped as a section of circular arc, as shown, so that adjustable tap 26 may be positioned by pen arm 45. The remainder of the electrical circuit is identical in form and in operation with the circuit shown in Fig. 1, and so is omitted from Figs. 4 and 5 to simplify the drawing.

In accordance with the patent statutes, I have described the principle of my invention and the apparatus which I now consider to represent the best embodiment thereof, but I wish it to be understood that the apparatus shown is illustrative only and that the invention may be carried out by other means.

What I claim as new and desire to secure by Letters Patent of the United States is:

Apparatus to graphically record upon a moving chart the value of a variable voltage, comprising means to support and move said chart, two shafts positioned to have their axes substantially in a straight line, a constant speed electric motor connected to rotate one shaft in one direction at a constant speed, a variable-speed electric motor connected to rotate the other shaft in the opposite direction at a variable speed, speed control means for the variable speed motor operable in response to a voltage to be recorded, a pen arm which rotates about the common axis of the shafts and extends outward substantially perpendicular thereto, the outer end of said pen arm traveling laterally across the chart responsive to such rotation, means including a differential gear to rotate the pen arm an amount proportional to the difference between the rotations of the two shafts, and a writing member attached to the outer end of the pen arm and positioned thereby on the chart.

THEODORE A. RICH.

REFERENCES CITED

The following references are of record in the file of this patent:

UNITED STATES PATENTS

| Number | Name | Date |
| --- | --- | --- |
| 1,583,536 | Egy | May 4, 1926 |
| 1,669,107 | Umansky | May 8, 1928 |
| 1,717,191 | Cremer | June 11, 1929 |
| 1,718,742 | Korndorfer et al. | June 25, 1929 |
| 1,907,132 | Thurston | May 2, 1933 |
| 2,116,593 | Bouvier et al. | May 10, 1938 |
| 2,219,775 | Harrison | Oct. 29, 1940 |
| 2,367,868 | Jones | Jan. 23, 1945 |
| 2,369,806 | Slonneger | Feb. 20, 1945 |
| 2,411,147 | Cooley | Nov. 19, 1946 |
| 2,421,560 | Haynes | June 3, 1947 |
| 2,425,613 | Gibbs | Aug. 12, 1947 |
| 2,522,240 | Sias | Sept. 12, 1950 |